Nov. 10, 1964 D. BIERMANN 3,156,301

VARIABLE PITCH PROPELLER

Filed Dec. 7, 1962 3 Sheets-Sheet 1

INVENTOR.
DAVID BIERMANN

BY Toulmin & Toulmin

ATTORNEYS

Nov. 10, 1964 D. BIERMANN 3,156,301

VARIABLE PITCH PROPELLER

Filed Dec. 7, 1962 3 Sheets-Sheet 2

INVENTOR.
DAVID BIERMANN

BY Toulmin & Toulmin

ATTORNEYS

Nov. 10, 1964 D. BIERMANN 3,156,301

VARIABLE PITCH PROPELLER

Filed Dec. 7, 1962 3 Sheets-Sheet 3

INVENTOR.
DAVID BIERMANN

BY Toulmin & Toulmin

ATTORNEYS

United States Patent Office 3,156,301
Patented Nov. 10, 1964

3,156,301
VARIABLE PITCH PROPELLER

David Biermann, Piqua, Ohio, assignor to Hartzell Propeller, Inc., Piqua, Ohio, a corporation of Ohio
Filed Dec. 7, 1962, Ser. No. 243,057
20 Claims. (Cl. 170—160.14)

This invention relates to variable pitch propellers for aircraft and is particularly concerned with variable pitch propellers of the constant speed type having automatically actuated hydraulic control means.

Constant speed variable pitch propellers are widely employed on aircraft and usually employ a hydraulic motor for adjusting the pitch of the propeller blades so that variations in the propeller pitch will tend to hold the driving engine speed substantially constant. In the usual propeller arrangement of this type, the oil supply to the hydraulic pitch adjusting motor is under the control of a governor driven by the propeller driven engine, and the oil under the control of the governor is supplied to and from the pitch adjusting motor through a rotary seal arrangement that permits oil flow through the drive shaft leading into the propeller hub.

There are many aircraft, however, which have no provision for mounting a governor on the engine to be driven thereby, and even where there is provision for a governor to be associated with the engine, the mounting of the governor and the connecting thereof with the propeller and the supplying of manual controls and the like, lead to great expense and complications. For these reasons, the pronounced advantages of a constant speed propeller cannot be availed of economically for all aircraft.

In my issue Patent 3,027,949 there is shown a propeller construction in which the governor mechanism is incorporated directly in the propeller hub together with the pitch changing motor. A characteristic of this invention, however, is that the propeller is gear driven from an offset engine drive shaft so that it is possible to gain access to the hydraulic pump forming a part of the pitch changing mechanism from the end of the propeller drive shaft. Specifically, there is a pump drive shaft or reaction shaft that extends axially through the propeller hub and drive shaft so as to be available from outside the propeller in order to control the hydraulic pump.

The present invention represents further developments and refinements in the arrangement of the aforesaid patent insofar as the entire pitch controlling mechanism, including the speed sensitive governor, the source of hydraulic fluid, and the pump for pressurizing the hydraulic fluid, are all located within the propeller hub. However, the arrangement of the present invention eliminates the particular and extremely limiting feature of the aforesaid patent in that it is not necessary to drive the propeller according to the present invention, by means of an offset drive shaft. The propeller according to the present invention, also incorporates additional features in the form of improved controls for controlling the propeller pitch.

With the foregoing in mind, it will be apparent that a primary object of the present invention is the provision of a variable pitch propeller of the constant speed type which is completely self-contained and which can, therefore, be installed on any driving engine regardless of whether or not the engine includes provisions for supporting and driving a governor.

Still another object of the present invention is the provision of a variable speed propeller of the constant speed type having integral therewith a hydraulic mechanism for controlling the pitch of the propeller blades, and including control means whereby the influence of a governor included in the hydraulic circuit can be varied to take into account the particular operating conditions under which the propeller is working.

Still another object of the present invention is the provision of a hydraulically operable constant speed variable pitch propeller in which the entire mechanism for adjusting and controlling the propeller pitch is contained within the propeller hub as an integral part of the propeller, while, at the same time, the propeller is not excessive in weight and is relatively simple in construction and low in cost.

Another particular object of the present invention is the provision of a hydraulically operated variable pitch propeller of the constant speed type in which the air stream which is moving across the propeller hub has a direct effect upon the control of the pitch of the propeller.

These and other objects and advantages of this invention will become more apparent upon reference to the following specification, taken in connection with the accompanying drawings in which.

Figure 1:
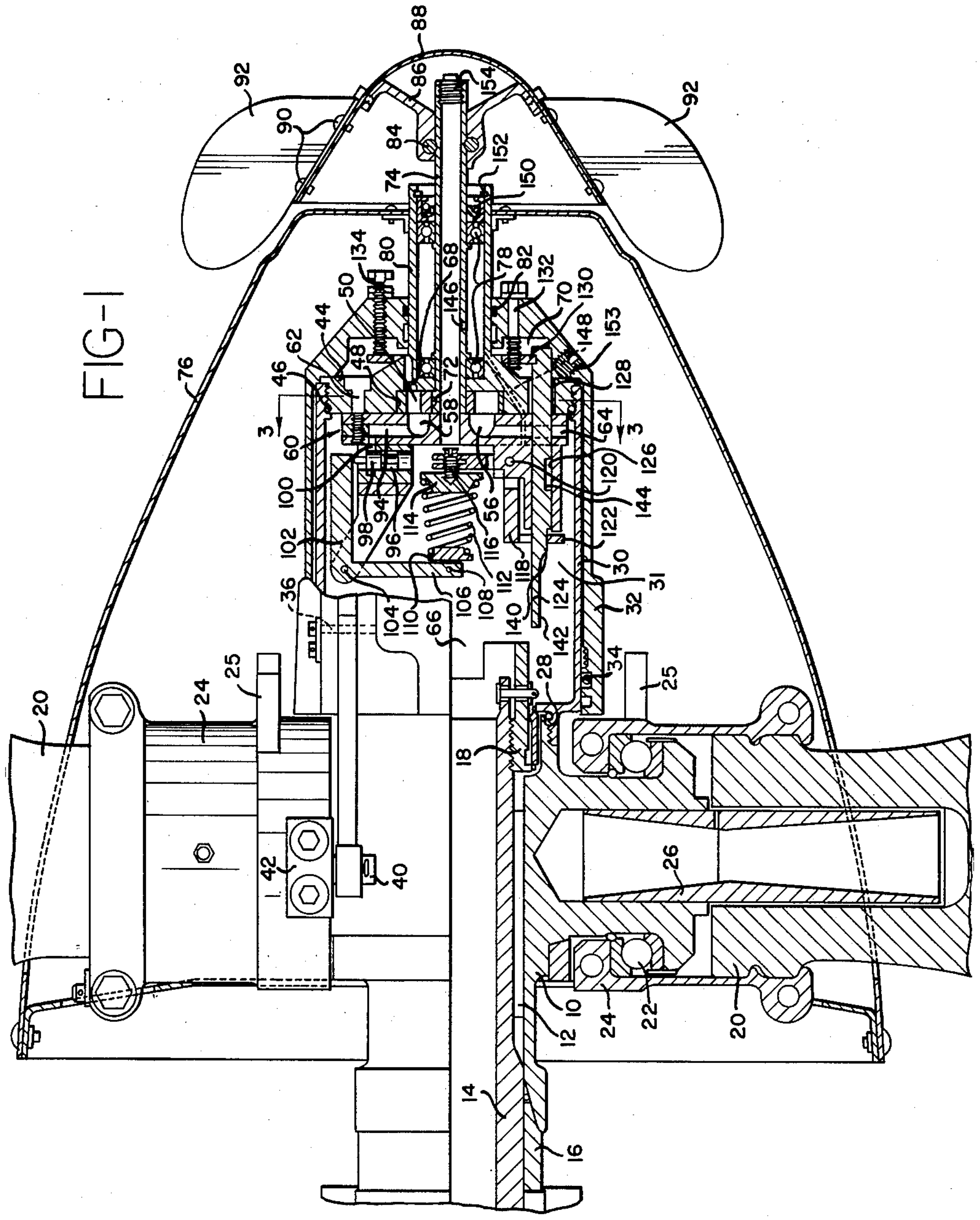
FIGURE 1 is a partial longitudinal section taken through a propeller constructed according to the present invention with certain of the parts somewhat diagrammatically illustrated.

Referring to the drawings somewhat more in detail, the propeller comprises a hub spider 10 having a keyed connection as at 12 with engine drive shaft 14 on which the hub spider is retained by means of a rear cone 16 and a clamp nut 18 located at the front end of the hub spider.

The spider, according to well-known practices, supports the blades 20 for rotation on their axes. The blades are freely movable in rotation by being supported on the anti-friction 22 and are fixedly secured against any other type of movement on the spider by the clamp means 24.

The tubular pilot elements 26 carried by the propeller hub and extending into the ends of the blades supports the blades against deflection in a lateral direction.

Fixed to the front end of the hub, as by threads 28, is a cylinder 30. Cylinder 30 slideably receives a piston member 32 which is sealed to the cylinder by sealing ring 34.

The piston 32 is connected by pins 36 with the links that extend rearwardly along the propeller hub to be connected by pins 40 with the brackets 42 that are secured to the sides of the clamps 24 of the individual blades of the propeller. It will be evident that movement of piston 32 on cylinder 30 will result in rotation of the propeller blades on their axes, whereby the pitch of the propeller is varied.

It has been mentioned that the hydraulically actuated mechanism for the aforementioned motor consisting of cylinder 30 and piston 32 is contained within the propeller hub structure. This mechanism takes the form of the apparatus principally located in the region of the right or outer end of cylinder 30, which outer end of the said cylinder is closed by an end member 44 which is sealed to the cylinder wall by the seal ring 46, cylinder 30 is hollow and forms a chamber or reservoir 31 for hydraulic fluid.

Figures 2, 3, 4:
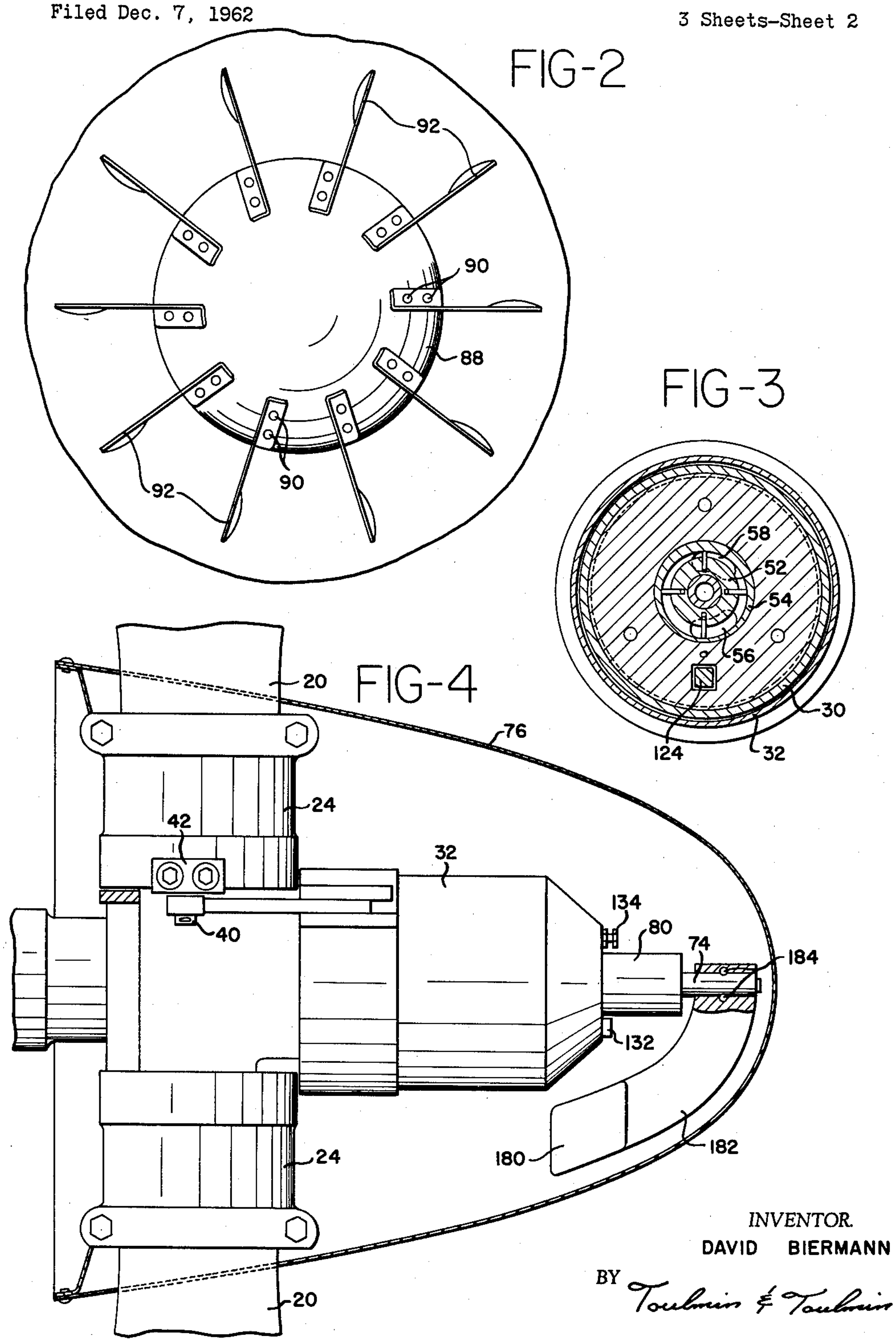
FIGURE 2 is a partial end elevational view of the propeller showing an air stream actuated reaction member forming a part of the propeller structure.
FIGURE 3 is a sectional view indicated by line 3—3 on FIGURE 1 showing one construction for the hydraulic pump forming a part of the hydraulic circuit and also located within the hub of the propeller.
FIGURE 4 is a fragmentary view showing the manner in which a weight can be employed for controlling the pump reaction member instead of the vaned unit of FIGURES 1 and 2.

The end member 44 for the cylinder has a cavity 48 therein, and within this cavity is a pumping means generally indicated at 50, and which pumping means may take the form, for example, of a gear pump or a vane pump. One form of the pump is illustrated in FIGURE 3 wherein it will be seen that there is a vaned rotor 52 rotatable within a cylinder block 54 for transferring oil from an inlet port 56 to an outlet port 58. It will be evident that the pump can comprise a gear pump having an external gear and an internal gear, and that the same pumping of fluid from the inlet port to the outlet port would be had.

In FIGURE 1 it will be observed that on the inside of end member 44 of the cylinder there is secured a governor body 60 as by the screws 62. Within this governor body there is formed the aforementioned suction port 56 for pump 50 and the discharge port 58 therefor. The suction port 56 communicates via passage 64 with the interior of cylinder 30, which serves as a fluid reservoir, and has oil therein as indicated by reference numeral 66.

Within the range of discharge port 58, but on the opposite side of the pump, is a discharge passage 68 leading through cylinder end member 44 into the chamber 70 within piston 32. A supply of pressure to this chamber will cause piston 32 to move toward the right and thereby to increase the pitch of the propeller blades.

The supply of fluid pumped by pump 50 depends upon the relative rotation between the rotor portion 52 of the pump 50 and the stator portion 54. For controlling this relative rotation, rotor 52 is keyed by key 72 to hollow shaft 74 that extends out through the nose of the spinner 76 that rotates with the propeller hub and which extends outwardly toward the front therefrom, tapering inwardly to provide for streamline flow of air to the propeller blades. Hollow shaft 74 is supported on the anti-friction bearings 78 carried within sleeve member 80 that is fixed to, or is integral with, end member 44 of cylinder 30. Sleeve member 80 extends through the end of piston 32 and is sealed thereto as by the sealing means 82.

The hollow shaft 74 extends out beyond the end of sleeve member 80 and has fixed thereto, as by key means 84, a hub member 86. Hub member 86 carries a conical metal element 88 which forms a substantial continuation of spinner 76 and thus defines the nose thereof except that it is rotatable relative to the spinner. Fixed to the member 88, as by rivets 90, are the vanes 92 which provide the means for controlling relative rotation between rotor 52 and stator 54 of pump 50.

Returning to the governor structure, the discharge port 58 pertaining to the pump 50 is more properly a portion of a by-pass channel 94 which leads to a valve bore 96 that is under the control of a governor valve member 98. When valve member 98 is disposed inwardly from the outer end of valve bore 96, the by-pass channel 94 connects the discharge side of pump 50 with the reservoir. But when the valve member moves outwardly in bore 96 so that it is in restrictive or closing relation to part 100 at the end of the by-pass channel, the discharge from the pump to the reservoir is throttled or interrupted and this develops pressure in chamber 70 to urge piston 32 outwardly on cylinder 30 toward increased pitch position.

The control of governor valve member 98 is effected by the fly ball means 102 pivoted to the governor body at 104 and having a radially inwardly extending arm 106 which has pivoted thereto at 108 a spring support member 110. One end of a governor spring 112 engages member 110, while the other end of the spring rests on a similar spring support member 114. Member 114 rests on the end of an adjustment screw 116. Screw 116 is adjustably mounted in one arm on a lever 118 which is pivoted at 120 to the governor body. The other arm of lever 118 has a dependent apertured portion 122 through which a cam bar 124 is slideable. This cam bar extends slideably through a bore 126 in the governor body and through a clearance hole 128 in the cylinder end member 44 into engagement with a plate 130 that is adjustably connected to the piston head as by the screws 132 and 134. The cam bar 124, as will be seen, moves with the piston 32, but is adjustably secured thereto.

The cam bar has a contoured surface thereon engaged by one edge of the aperture in portion 122 so that as the cam bar is moved by the piston 32, it will change the bias of governor spring 112, and this will change the control speed of the governor. As illustrated, the cam bar comprises a higher speed portion 140 and a lower speed portion 142 which latter portion includes an inclined region so that, as the cam bar moves toward the right, there is first, a relatively sudden change in the control speed and, then, a more gradual change.

The cam bar also comprises a notch 144 therein which, as piston 32 moves toward its extreme outward position on cylinder 30, moves into position to establish communication between suction passage 64 and clearance hole 128 so that pressure cannot be maintained within chamber 70, and a maximum shifted position of piston 32 is thereby pre-determined by notch 144.

The reservoir space inside cylinder 30 communicates via the inside of hollow shaft 74 and port 146 with the space inside sleeve 80 between anti-friction bearings 78. Furthermore, the space inside sleeve 80 communicates via passage 148 with the reservoir so that liquid which accumulates within sleeve 80 will be returned to the reservoir as the propeller rotates.

The extreme right end of sleeve 80 is closed by a seal 150 held in place by snap ring 152.

The reservoir inside cylinder 30 is arranged for being filled through a threaded opening in the piston 32 which is normally closed by a plug 153. When the reservoir is being filled, plug 154 in the outer end of shaft 74 is removed to permit air to escape. Plug 154 also serves to indicate the proper degree of filling the reservoir, which is about half full, so that the filling operation can be terminated when oil runs out of shaft 74, whereupon plugs 153 and 154 are replaced. During the filling operation, oil entering the opening, which is closed by plug 153, first flows into piston cavity 70. It then follows pump and governor passages 68, 50, 58, 94 and 100, until it reaches the reservoir 31 inside of cylinder 30.

*Operation of the Embodiment of FIGURES 1–3*

In the embodiment of FIGURES 1–3 of this invention centrifugal force acting on the blades 20, on account of the disposition of mass of the blades or on account of counterweights thereon, tends to rotate them about their own axes into a reduced pitch setting. Such counterweights are shown at 25 in FIGURES 1 and 5. Oil pressure acting on piston 32, on the other hand, tends to increase pitch. This oil pressure is regulated by the described governor-pump system in such a way that the resulting rotational speed remains constant for any given flight condition; but is adjusted to a different rotational speed when the flight condition is changed. This is accomplished in the following manner.

During static runup of the engine the centrifugal force acting on the blades will force them into low pitch, which is the desired condition for takeoff. It is unimportant at this point whether or not the inflow of air produced by the propeller is sufficient to cause the anti-torque vanes to stop rotating or not.

However, as the engine is speeded up for takeoff, and as the takeoff is made, the airflow thru the anti-torque vanes increases and the rotation of shaft 74 and the vaned member connected thereto, if these have been rotating, will come to a halt at some value of air speed. This speed where the vanes stop turning can be adjusted by bending the tail portions of vanes 92 to form cambered air foils which will produce torque in the opposite direction to the propeller rotation. At air speeds above this, the vanes 92 will drive shaft 74 to rotate in the direction opposite to that of the propeller, thus increasing the flow of the hydraulic pump 50.

As the air speed of the aircraft increases the propeller will start to overspeed. This will cause flyball 102 to move out by the centrifugal force against the action of governor spring 112. Valve spool 90 will also move out with flyball 102 and close on throttle oil discharge port 100 of oil passage 94. This forces the oil being pumped by pump 50 to flow through channel 68 into chamber 70, causing piston 32 to move to the right. This increases the pitch of blades 20, resulting in an increase in required torque, which has the effect of slowing down the engine to the original r.p.m. value; at which time the governor starts to by-pass oil again back to the reservoir inside cylinder 30.

The r.p.m. is held constant during takeoff, and into climb at full throttle at the air speed for the best rate of climb. This provides for maximum takeoff and climb performance.

After the aircraft has reached a safe altitude it is generally desired to reduce the power settings for further climb or cruise.

The aircraft angle of climb is then reduced so that the air speed of the aircraft will increase. This allows the blade angle to increase and the piston 32 to move toward the right on account of the governor action. Cam bar 124, which is attached to piston 32 for movement therewith, readjusts cam follower 122 to a new position, which in turn, reduces the compression of governor spring 112, and provides for a lower governing rotational speed.

Cam bar 124 is formed in such a way as to provide a schedule of governor settings according to the flight regime; such as: takeoff, climb at maximum rate, climb at reduced power, cruise, and glide at reduced power.

The position of the blade angle, and therefore the cam, is determined not only by air speed but by engine throttle setting. The throttle setting will affect to some degree the air speed at which the rotational speed changes from one value to another. Reducing the throttle setting results in reducing the blade angle for a given constant rotational speed. In order to compensate for this reduced blade angle, the air speed must increase in order to bring the cam back to the original position. The effect of throttle setting is minor for cruise condition since the r.p.m. remains fairly constant over a wide range of cam positions.

There is little effect of power on cam positions due to flight at altitudes with an unsupercharged engine, since the power of the engine decreases with altitude at only a slightly greater rate than the power being absorbed by the propeller blades for a given blade angle. This means that as the altitude is increased, the blade angle remains about constant and the governor setting remains nearly constant also. Therefore, maximum r.p.m. can be obtained at any altitude for take off and climb, and the cruise r.p.m. will be about the same as for reduced altitudes.

*Embodiment of FIGURE 4*

An alternate method for holding shaft 74 stationary, during rotation of the entire propeller assembly, is shown in FIGURE 4. A weight 180, which is attached to shaft 74 by weight arm 182 and bolts 184, is acted upon by gravity to keep it hanging down below the axis centerline. This weight need not be large since the torque valves encountered are on the order of only a few inch pounds.

Figure 5:
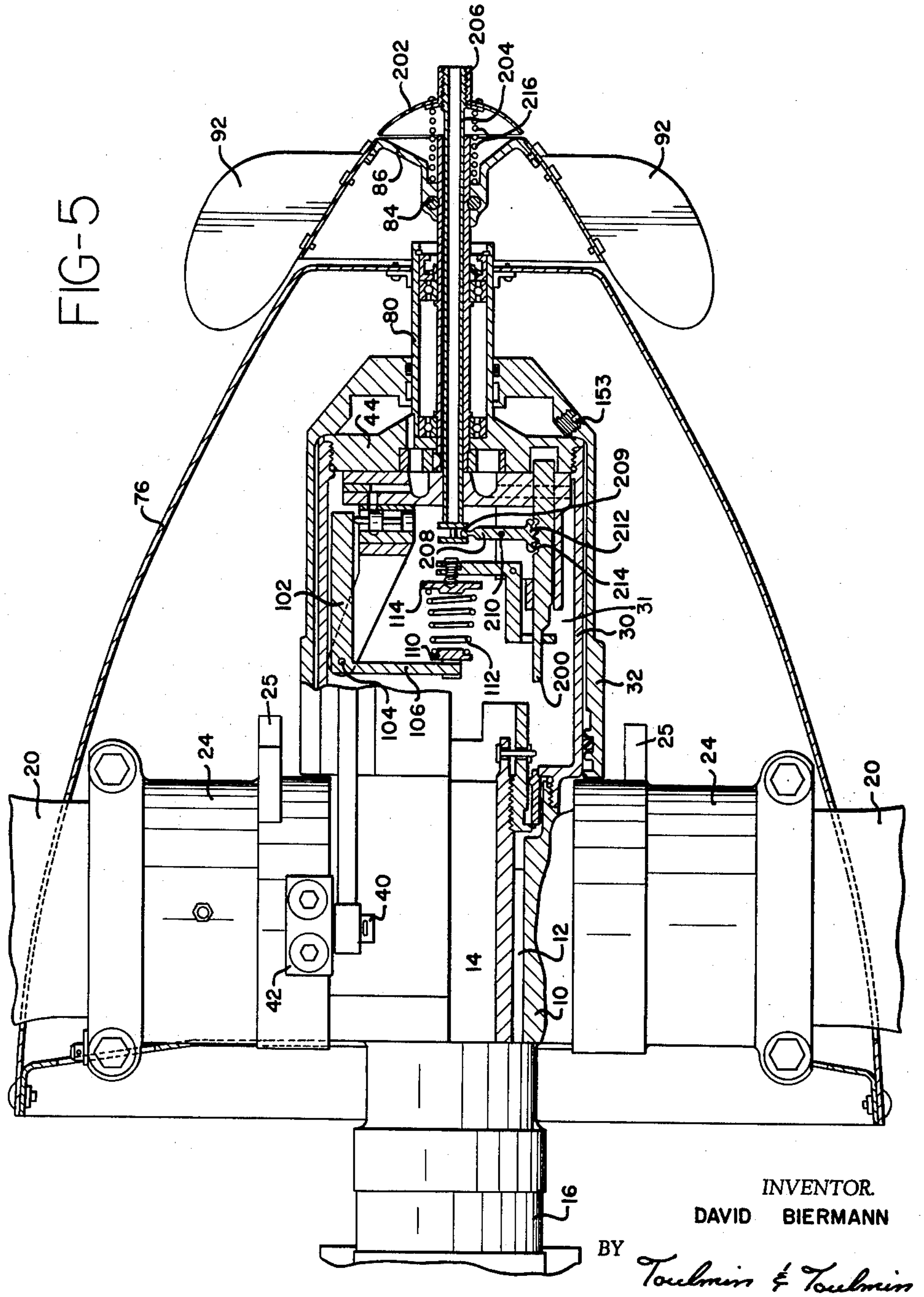
FIGURE 5 is a view similar to FIGURE 1 but shows a modified arrangement in which a control effect is had on the hydraulic control system of the propeller by the impact of air on the nose of the propeller.

*Embodiment of FIGURE 5*

In FIGURE 5 is shown an alternate arrangement and method for positioning a control cam 200, which corresponds to cam 124 of the modification of FIGURES 1–3. FIGURE 5 shows a cam actuator in which the cam adjusting force is a function of the impact pressure of the air flow only. Instead of positioning the cam 200 according to the position of the piston, which, in turn, corresponds to the blade angle, and which is a function of both power and air speed, the cam 200 in FIGURE 5 is positioned in accordance with a function of the impact pressure on the nose of the propeller spinner due to the forward movement of the aircraft.

The impact pressure of the air acts on air impact nose 202 tending to move it to the left. Nose 202 is attached to push rod 204 by means of threads 206. Motion is transmitted to cam 200 by means of lever 208, pivoted at 210 to the governor body and pivotally engaged at 209 by the push rod 204. Lever 208 has teeth 212 which mesh with teeth 214 formed in cam bar 200. Spring 216 opposes the movement of push rod 204 to the left; so that for any given impact pressure the position of cam 200 will be determined. The spring compression is adjustable by means of screw threads 206.

The same aerodynamic laws which affect the aircraft will also affect the pressure acting on the impact nose. An increase in altitude will reduce the impact pressure on nose 202 because the air density is reduced; but the speed for the best rate of climb is increased so that these two factors compensate for each other. Therefore, the propeller r.p.m. will remain at the maximum value during take off and climb at the speed for the best rate of climb, regardless of altitude. As the aircraft speed is increased, the cam will be actuated by the increased impact on nose 202 to reduce the governing r.p.m.

The FIGURE 5 embodiment is, therefore, self-compensating for changing conditions of flight, such as speed and altitude.

In the foregoing description of the propeller, it will be understood that the parts referred to as a cylinder and a piston are given these particular designations for convenience only, and that these parts are actually reversible so that it is not intended that the particular terminology employed for the respective parts is to be limiting in any manner.

In connection with the first modification, the notch formed in the cam bar that provides the function of a relief valve or a high pitch limit stop, could take the form of an entirely separate valve member inasmuch as the function of this relief valve is dependent solely upon the pitch adjustment of the propeller. It will also be understood that a similar high pitch stop or relief valve could be provided with the modification of FIGURE 5 if so desired.

All of the modifications illustrated are characterized in that the propeller is entirely self-contained and that no access is required to the interior thereof from the engine side of the propeller hub. The propeller is characterized in that the blades are urged toward low pitch position while the propeller is rotating, preferably by counterweights on the propeller blades, or by the disposition of the mass of the blades. It will be understood, however, that the use of a biasing spring urging the propeller blades toward reduced pitch position, or the employment of aerodynamics on the propeller blades urging them toward reduced pitch position are not precluded.

It will be understood that this invention is susceptible to modification in order to adapt it to different usages and conditions; and accordingly, it is desired to comprehend such modifications within this invention as may fall within the scope of the appended claims.

I claim:

1. A variable pitch propeller comprising: a hub, blade means supported on and extending radially from the hub and being rotatable on the hub for changing the blade pitch, means operable during rotation of the propeller for urging the blade means toward reduced pitch position, fluid motor means carried by the hub operable in response to a supply of pressure fluid thereto for urging the blade means toward increased pitch position, and means carried in its entirety by the propeller hub for effecting a controlled supply of pressure fluid to said fluid motor means, said last mentioned means including a fluid reservoir, a pump having its inlet connected to said reservoir and having an outlet, a first circuit connecting said outlet with said motor means, a second circuit connecting said outlet with said reservoir including therein a propeller speed responsive governor means to control the fluid flow in said second circuit, and means operatively connected with the said pump and arranged at the nose end of said propeller operative for effecting actuation of said pump in response to rotation of said propeller.

2. A variable pitch propeller comprising; a hub, blade means supported on and extending radially from the hub and being rotatable on the hub for changing the blade pitch, means operable during rotation of the propeller for urging the blade means toward reduced pitch position, fluid motor means carried by the hub operable in response to a supply of pressure fluid thereto for urging the blade means toward increased pitch position, and means carried in its entirety by the propeller hub for effecting a controlled supply of pressure fluid to said fluid motor means, said last mentioned means including a fluid reservoir, a pump having its inlet connected to said reservoir and having an outlet, a first circuit connecting said outlet with said motor means, a second circuit connecting said outlet with said reservoir and including therein a propeller speed responsive governor means to control the fluid flow in said second circuit, and means operatively connected with the said pump and arranged at the nose end of said propeller operative for effecting actuation of said pump in response to rotation of said propeller, said means operatively connected to said pump comprising a shaft coaxial with the axis of rotation of the propeller, and vane means carried on the shaft externally of the propeller at the nose end thereof and under the influence of air moving past the propeller when the propeller rotates.

3. A variable pitch propeller comprising; a hub, blade means supported on and extending radially from the hub and being rotatable on the hub for changing the blade pitch, means operable during rotation of the propeller for urging the blade means toward reduced pitch position, fluid motor means carried by the hub operable in response to a supply of pressure fluid thereto for urging the blade means toward increased pitch position, and means carried in its entirety by the propeller hub for effecting a controlled supply of pressure fluid to said fluid motor means, said last mentioned means including a fluid reservoir, a pump having its inlet connected to said reservoir and having an outlet, a first circuit connecting said outlet with said motor means, a second circuit connecting said outlet with said reservoir and including therein a propeller speed responsive governor means to control the fluid flow in said second circuit, and means operatively connected with the said pump for effecting actuation of said pump in response to rotation of said propeller, comprising a shaft coaxial with the axis of rotation of the propeller, and a weight offset from the axis of the shaft and connected to the outer end of said shaft at the nose end of said propeller so as to tend to hold the shaft stationary as the propeller rotates.

4. A variable pitch propeller comprising; a hub, blade means supported on and extending radially from the hub and being rotatable on the hub for changing the blade pitch, means operable during rotation of the propeller for urging the blade means toward reduced pitch position, fluid motor means carried by the hub operable in response to a supply of pressure fluid thereto for urging the blade means toward increased pitch position, and means carried in its entirety by the propeller hub for effecting a controlled supply of pressure fluid to said fluid motor means, said last mentioned means including a fluid reservoir, a pump having its inlet connected to said reservoir and having an outlet, a first circuit connecting said outlet with said motor means, a second circuit connecting said outlet with said reservoir and including therein a propeller speed responsive governor means to control the fluid flow in said second circuit, and means operatively connected with the said pump and arranged at the nose end of said propeller operative for effecting actuation of said pump in response to rotation of said propeller, said governor means including a control spring, and means for adjusting the bias of the control spring to change the control speed of the propeller.

5. A variable pitch propeller comprising; a hub, blade means supported on and extending radially from the hub and being rotatable on the hub for changing the blade pitch, means operable during rotation of the propeller for urging the blade means toward reduced pitch position, fluid motor means carried by the hub operable in response to a supply of pressure fluid thereto for urging the blade means toward increased pitch position, and means carried in its entirety by the propeller hub for effecting a controlled supply of pressure fluid to said fluid motor means, said last mentioned means including a fluid reservoir, a pump having its inlet connected to said reservoir and having an outlet, a first circuit connecting said outlet with said motor means, a second circuit connecting said outlet with said reservoir and including therein a propeller speed responsive governor means to control the fluid flow in said second circuit, and means operatively connected with the said pump and arranged at the nose end of said propeller operative for effecting actuation of said pump in response to rotation of said propeller, said governor means comprising a control spring, a cam associated with the said spring movable for varying the spring bias, thereby to adjust the control speed of the propeller, said cam being operatively connected with said blade means so as to be movable therewith, whereby the operation of the cam is dependent upon the pitch of the propeller.

6. A variable pitch propeller comprising; a hub, blade means supported on and extending radially from the hub and being rotatable on the hub for changing the blade pitch, means operable during rotation of the propeller for urging the blade means toward reduced pitch position, fluid motor means carried by the hub operable in response to a supply of pressure fluid thereto for urging the blade means toward increased pitch position, and means carried in its entirety by the propeller hub for effecting a controlled supply of pressure fluid to said fluid motor means, said last mentioned means including a fluid reservoir, a pump having its inlet connected to said reservoir and having an outlet, a first circuit connecting said outlet with said motor means, a second circuit connecting said outlet with said reservoir including therein a propeller speed responsive governor means to control the fluid flow in said second circuit, and means operatively connected with the said pump and arranged at the nose end of said propeller operative for effecting actuation of said propeller in response to rotation of said propeller, said governor means comprising a control spring, a cam associated with said spring movable for adjusting the bias of the spring thereby to adjust the control speed of the propeller, and means sensitive to the speed of the propeller through the air for adjusting said cam.

7. A variable pitch propeller comprising; a hub, blade means supported on and extending radially from the hub and being rotatable on the hub for changing the blade pitch, means operable during rotation of the propeller for urging the blade means toward reduced pitch position, fluid motor means carried by the hub operable in response to a supply of pressure fluid thereto for urging the blade means toward increased pitch position, and means carried in its entirety by the propeller hub for effecting a controlled supply of pressure fluid to said fluid motor means, said last mentioned means including a fluid reservoir, a pump having its inlet connected to said reservoir and having an outlet, a first circuit connecting said outlet with said motor means, a second circuit connecting said outlet with said reservoir including therein a propeller speed responsive governor means to control the fluid flow in said second circuit, and means operatively connected with the said pump and arranged at the nose end of said propeller operative for effecting actuation of said propeller in response to rotation of said propeller, said governor means comprising a control spring, a cam associated with said spring movable for adjusting the bias of the spring thereby to adjust the control speed of the propeller, an impact plate positioned on the nose of the propeller and connected with said cam, a spring biasing said impact plate to move outwardly on the propeller, and said impact plate being acted upon by air moving toward the propeller for movement against the bias of said spring.

8. A variable pitch propeller, comprising; a hub, blade means supported on and extending radially from the hub, said blade means being rotatable for changing the pitch thereof, a mass formed into said blade means and acted upon by centrifugal force as the propeller rotates tending to reduce the pitch of the blades, a fluid motor element connected to said blade means and responsive to a supply of fluid under pressure for increasing the pitch of the blade means, a reservoir of fluid, pump means connected to said reservoir and to said fluid motor element actuated by propeller rotation for transferring fluid from said reservoir to said fluid motor element, governor means associated with said pump means operable for changing the flow of the propeller fluid from said pump means to said fluid motor element, said governor being operable in response to changes in rotational speed of the propeller above or below a predetermined governing value, and regulating means for automatically changing said predetermined governing speed of said governor means according to a predetermined schedule of forward speeds of the propeller.

9. A variable pitch propeller, comprising; a hub, blade means supported on and extending radially from the hub, said blade means being rotatable for changing the pitch thereof, a mass formed into said blade means and acted upon by centrifugal force as the propeller rotates tending to reduce the pitch of the blades, a fluid motor element connected to said blade means and responsive to a supply of fluid under pressure for increasing the pitch of the blade means, a reservoir of fluid, pump means connected to said reservoir and to said fluid motor element actuated by propeller rotation for transferring fluid from said reservoir to said fluid motor element, governor means associated with said pump means operable for changing the fluid flow from said pump means to said fluid motor element, said governor being operable in response to changes in rotational speed of the propeller above or below a predetermined governing value, and regulating means for automatically changing said predetermined governing speed of said governor means according to a predetermined schedule of blade pitch values.

10. A variable pitch propeller comprising; a hub, a blade extending radially from said hub, said blade being rotatably supported on said hub for rotation about its own axis, said blade being weighted for action by centrifugal force to provide a force tending to reduce the pitch thereof, piston-cylinder means mounted on the rotational axis of said hub for rotation therewith, said piston-cylinder means being connected between said hub and said blade for rotation of said blade upon relative movement of said piston and cylinder, a fluid reservoir, a fluid pump mounted on said hub having a drive shaft whose axis coincides with the axis of rotation of the propeller and which has an extension extending to the outside of the propeller, vane means mounted on said pump drive shaft extension and acted upon by aerodynamic forces to induce relative rotation between the pump drive shaft and the propeller as the propeller rotates, a first oil passage connecting the inlet of said pump with said fluid reservoir, a second oil passage connecting the outlet of said pump with said piston cylinder means, a third oil passage connecting the outlet of said pump with said reservoir, a valve associated with said third oil passage, and governor means cooperating with said valve for moving said valve for controlling fluid flow in said third oil passage in response to the propeller reaching a predetermined rotational speed.

11. A variable pitch propeller, comprising; a hub, a blade extending radially from said hub, said blade being rotatably supported on said hub for rotation about its own axis, a cylinder mounted on the rotational axis of said hub for rotation therewith, a piston slidably mounted on said cylinder, a piston chamber between said piston and said cylinder, a link connecting said piston with said blade for rotation of said blade upon movement of said piston on said cylinder, a fluid reservoir, a fluid pump mounted on said cylinder having a drive shaft coaxial with the axis of rotation of said propeller and extending out from said cylinder and piston, vane means mounted on said pump drive shaft externally of the propeller and acted upon by aerodynamic forces to urge said shaft to rotate relative to the propeller when the propeller is rotating, a first oil passage connecting the inlet of said pump with said fluid reservoir, a second oil passage connecting the outlet of said pump with said piston chamber, a third oil passage connecting the outlet of said pump wtih said reservoir, a valve associated with said third oil passage, a centrifugal responsive governor flyball and governor spring combination cooperating with said valve for moving said valve in a direction for closing said third oil passage as the propeller approaches a predetermined rotational speed and moving the valve in the opposite direction in response to the propeller dropping below said predetermined rotational speed, a cam member attached to said piston for movement therewith, and a lever engaging the surface of said cam and also engaging said governor spring for transmitting displacement of said cam surface to said spring for changing the compression of said spring according to a schedule related to said piston position.

12. A variable pitch propeller, comprising; a hub, a blade extending radially from said hub, said blade being rotatably supported on said hub for rotation about its own axis, a cylinder mounted on the rotational axis of said hub for rotation therewith, a piston slidably mounted on said cylinder, a piston chamber between said piston and said cylinder, a link connecting said piston with said blade for rotation of said blade upon movement of said piston on said cylinder, a fluid reservoir, a fluid pump mounted on said cylinder having a drive shaft coaxial with the axis of rotation of said propeller and extending out from said cylinder and piston, a weight suspended from said pump drive shaft to resist rotation thereof when the propeller rotates, a first oil passage connecting the inlet of said pump with said fluid reservoir, a second oil passage connecting the outlet of said pump with said piston chamber, a third oil passage connecting the outlet of said pump with said reservoir, a valve associated with said third oil passage, a centrifugal responsive governor flyball and governor spring combination cooperating with said valve for moving said valve in a direction for closing said third oil passage as the propeller approaches a predetermined rotational speed and moving the valve in the opposite direction in response to the propeller dropping below said predetermined rotational speed, a cam member attached to said piston for movement therewith, and a lever engaging the surface of said cam and also engaging said governor spring for transmitting displacement of said cam surface to said spring for changing the compression of said spring according to a schedule related to said piston position.

13. A variable pitch propeller, comprising; a hub, a blade extending radially from said hub, said blade being rotatably supported on said hub for rotation about its own axis, cylinder-piston means, said cylinder being fixed to the hub and said piston being connected to said blade, movement of said piston changing the pitch of the blade, a fluid reservoir, a fluid pump mounted on said cylinder, said pump having a drive shaft rotatable relative to the propeller to actuate the pump, the axis of said shaft coinciding with the axis of rotation of the propeller, said shaft extending out from said cylinder-piston means, vane means mounted on said pump drive shaft externally of the propeller and acted upon by aerodynamic forces to reduce rotation of said shaft relative to the propeller when the propeller is rotating, a first oil passage connecting the inlet of said pump with said fluid reservoir, a second oil passage connecting the outlet of said pump with said cylinder-piston means, a third oil passage connecting the outlet of said pump with said reservoir, a valve associated with said third oil passage, a centrifugal responsive governor flyball and governor spring combination cooperating with said valve for moving said valve in a direction for closing said third oil passage upon the propeller approaching a predetermined rotational speed and for moving the valve in a direction for opening said third oil passage upon the rotational speed of the propeller receding from said predetermined rotational speed, a cam member, a lever member engaging said cam member surface and also engaging said governor spring for transmitting displacement of said cam surface to said spring for changing the compression of said spring according to the schedule provided for by said cam upon movement thereof, a nose member on the propeller exposed to the aerodynamic impact pressure resulting from forward motion thru the air, linkage connecting said nose member with said cam member for movement of the cam member by the nose member, and a spring engaging said linkage tending to resist the action of aerodynamic pressure acting on said nose member.

14. A variable pitch propeller, comprising; a hub, a blade extending radially from said hub, said blade being rotatably supported on said hub for rotation about its own axis, a cylinder mounted on the rotational axis of said hub for rotation therewith, a piston slidably mounted on said cylinder, a piston chamber between said piston and said cylinder, a link connecting said piston with said blade for rotation of said blade upon movement of said piston on said cylinder, a fluid reservoir, a fluid pump mounted on said cylinder having a drive shaft coaxial with the axis of rotation of said propeller and extending out from said cylinder and piston, vane means mounted on said pump drive shaft externally of the propeller and acted upon by aerodynamic forces to urge said shaft to rotate relative to the propeller when the propeller is rotating, a first oil passage connecting the inlet of said pump with said fluid reservoir, a second oil passage connecting the outlet of said pump with said piston chamber, a third oil passage connecting the outlet of said pump with said reservoir, a valve associated with said third oil passage, a centrifugal responsive governor flyball and governor spring combination cooperating with said valve for moving said valve in a direction for closing said third oil passage as the propeller approaches a predetermined rotational speed and moving the valve in the opposite direction in response to the propeller dropping below said predetermined rotational speed, a cam member attached to said piston for movement therewith, and a lever engaging the surface of said cam and also engaging said governor spring for transmitting displacement of said cam surface to said spring for changing the compression of said spring according to a schedule related to said piston position, a fourth oil passage leading from said cylinder piston means to said reservoir, a sliding valve member attached to said piston and closing said fourth oil passage when the piston is in the normal operating range, said valve member opening said fourth oil passage when the piston has reached one end limit of its useful travel.

15. A variable pitch propeller, comprising; a hub, a blade extending radially from said hub, said blade being rotatably supported on said hub for rotation about its own axis, a cylinder mounted on the rotational axis of said hub for rotation therewith, a piston slidably mounted on said cylinder, a piston chamber between said piston and said cylinder, a link connecting said piston with said blade for rotation of said blade upon movement of said piston on said cylinder, a fluid reservoir, a fluid pump mounted on said cylinder having a drive shaft coaxial with the axis of rotation of said propeller and extending out from said cylinder and piston, a weight suspended from said pump drive shaft to resist rotation thereof when the propeller rotates, a first oil passage connecting the inlet of said pump with said fluid reservoir, a second oil passage connecting the outlet of said pump with said piston chamber, a third oil passage connecting the outlet of said pump with said reservoir, a valve associated with said third oil passage, a centrifugal responsive governor flyball and governor spring combination cooperating with said valve for moving said valve in a direction for closing said third oil passage as the propeller approaches a predetermined rotational speed and moving the valve in the opposite direction in response to the propeller dropping below said predetermined rotational speed, a cam member attached to said piston for movement therewith, and a lever engaging the surface of said cam and also engaging said governor spring for transmitting displacement of said cam surface to said spring for changing the compression of said spring according to a schedule related to said piston position, a fourth oil passage leading from said cylinder piston means to said reservoir, a sliding valve member attached to said piston and closing said fourth oil passage when the piston is in the normal operating range, and said valve member opening said fourth oil passage when the piston has reached one end limit of its useful travel.

16. A variable pitch propeller, comprising; a hub, a blade extending radially from said hub, said blade being rotatably supported on said hub for rotation about its own axis, a cylinder mounted on the rotational axis of said hub for rotation therewith, a piston slidably mounted on said cylinder, a piston chamber between said piston and said cylinder, a link connecting said piston with said blade for rotation of said blade upon movement of said piston on said cylinder, a fluid reservoir, a fluid pump mounted on said cylinder having a drive shaft coaxial with the axis of rotation of said propeller and extending out from said cylinder and piston, vane means mounted on said pump drive shaft externally of the propeller and acted upon by aerodynamic forces to urge said shaft to rotate relative to the propeller when the propeller is rotating, a first oil passage connecting the inlet of said pump with said fluid reservoir, a second oil passage connecting the outlet of said pump with said piston chamber, a third oil passage connecting the outlet of said pump with said reservoir, a valve associated with said third oil passage, a centrifugal responsive governor flyball and governor spring combination cooperating with said valve for moving said valve in a direction for closing said third oil passage as the propeller approaches a predetermined rotational speed and moving the valve in the opposite direction in response to the propeller dropping below said predetermined rotational speed, a cam member attached to said piston for movement therewith, and a lever engaging the surface of said cam and also engaging said governor spring for transmitting displacement of said cam surface to said spring for changing the compression of said spring according to a schedule related to said piston position, means for adjusting the position of said cam member in relation to said piston, and means for adjusting the tension of said governor spring in relation to said cam member.

17. A variable pitch propeller, comprising; a hub, a blade extending radially from said hub, said blade being rotatably supported on said hub for rotation about its own axis, a cylinder mounted on the rotational axis of said hub for rotation therewith, a piston slidably mounted on said cylinder, a piston chamber between said piston and said cylinder, a link connecting said piston with said blade for rotation of said blade upon movement of said piston on said cylinder, a fluid reservoir, a fluid pump mounted on said cylinder having a drive shaft coaxial with the axis of rotation of said propeller and extending out from said cylinder and piston, a weight suspended from said pump drive shaft to resist rotation thereof when the propeller rotates, a first oil passage connecting the inlet of said pump with said fluid reservoir, a second oil passage connecting the outlet of said pump with said piston chamber, a third oil passage connecting the outlet of said pump with said reservoir, a valve associated with said third oil passage, a centrifugal responsive governor flyball and governor spring combination cooperating with said valve for moving said valve in a direction for closing said third oil passage as the propeller approaches a predetermined rotational speed and moving the valve in the opposite direction in response to the propeller dropping below said predetermined rotational speed, a cam member attached to said piston for movement therewith, and a lever engaging the surface of said cam and also engaging said governor spring for transmitting displacement of said cam surface to said spring for changing the compression of said spring according to a schedule related to said piston position, means for adjusting the position of said cam member in relation to said piston, and means for adjusting the tension of said governor spring in relation to said cam member.

18. A self-contained constant speed propeller having a hub, a blade mounted at right angles to the rotational axis of the hub and arranged for rotation in said hub, a fluid motor mounted on the axis of rotation of said hub, link means connecting said fluid motor with said blade for limited rotational movement of said blade upon actuation of said fluid motor, a fluid reservoir mounted on said fluid motor, a fluid pump mounted on the fluid motor on the axis of rotation of the propeller and receiving fluid from said reservoir and connected for discharge fluid to said fluid motor and also to said reservoir, a pump drive shaft extending from said pump on the axis of rotation of the propeller rotatable relative to the propeller to actuate the pump, said drive shaft extending out the front end of the propeller, a vane mounted on said drive shaft and exposed to the aerodynamic forces resulting from forward motion of said propeller and formed to restrain said drive shaft from rotating with the propeller, and a speed responsive governor mounted on said fluid motor operable for closing said pump discharge to said reservoir upon the propeller exceeding a predetermined rotational speed, and opening said discharge during propeller rotational speeds below said predetermined rotational speed.

19. In a propeller according to claim 18, cam means linked to said blade for movement in unison therewith according to pitch changes of said blade, said cam means having a follower surface operatively connected to said governor for adjustment of said predetermined rotational speed according to a predetermined schedule.

20. In a propeller according to claim 18, a forward speed responsive element, a cam means linked to said forward speed responsive element and having a follower surface operatively connected to said governor for adjustment of said predetermined rotational speed according to a predetermined schedule relating to movement of said forward speed responsive element.

References Cited in the file of this patent

UNITED STATES PATENTS

| | | |
|---|---|---|
| 2,347,104 | Hoover | Apr. 81, 1944 |
| 2,722,985 | Biermann | Nov. 8, 1955 |
| 3,027,949 | Biermann | Apr. 3, 1962 |
| 3,083,892 | Carey et al. | Apr. 2, 1963 |

FOREIGN PATENTS

| | | |
|---|---|---|
| 476,852 | Great Britain | Dec. 16, 1937 |
| 501,054 | Great Britain | Feb. 20, 1939 |